United States Patent [19]
Michler

[11] Patent Number: 5,983,168
[45] Date of Patent: Nov. 9, 1999

[54] PHASE SHIFT ACCOMMODATION IN ACTIVE VIBRATION DAMPING SYSTEM

[75] Inventor: James R. Michler, Phillips, Wis.

[73] Assignee: Marquip, Inc., Phillips, Wis.

[21] Appl. No.: 09/046,267

[22] Filed: Mar. 23, 1998

[51] Int. Cl.$^6$ ............................. B60G 11/26; B60G 17/00
[52] U.S. Cl. ........................ 702/194; 702/56; 364/528.15; 73/66; 73/504.12; 73/570
[58] Field of Search ................ 702/194, 56; 364/528.15; 73/504.12, 570, 66

[56] References Cited

U.S. PATENT DOCUMENTS

| | | | |
|---|---|---|---|
| 4,626,730 | 12/1986 | Hubbard, Jr. | 310/326 |
| 4,916,632 | 4/1990 | Doi et al. | 364/528.15 |
| 5,525,853 | 6/1996 | Nye et al. | 310/316 |
| 5,713,438 | 2/1998 | Rossetti et al. | 188/378 |

*Primary Examiner*—John Barlow
*Assistant Examiner*—Hien Vo
*Attorney, Agent, or Firm*—Andrus, Sceales, Starke & Sawall

[57] ABSTRACT

An active vibration damping system (e.g. an active tuned mass damping system) uses phasor techniques for accommodating excessive phase shifts in system components (e.g. amplifier and actuators). Optimal control techniques are used to determine preliminary coefficient values for the controller model. These preliminary coefficients are scaled to account for differences in units and the scaled coefficients are then used to determine phase angle and relative phasor magnitudes. For each component of the control force on the tuned mass, the respective phasor is shifted to accommodate a known phase shift in the system while maintaining the same relative phasor magnitude for each component. The phase-shifted coefficient values are then scaled to return the coefficients to the original units, and these coefficients are used in the controller to generate the command signal to drive the actuator that provides the control force on the tuned mass. This technique can accommodate substantial phase shifts without rendering the system unstable.

15 Claims, 7 Drawing Sheets

PHASE SHIFT ACCOMMODATION IN ACTIVE VIBRATION DAMPING SYSTEM

FIELD OF THE INVENTION

The invention relates to active vibration control. More specifically, the invention relates to a technique for accommodating known phase shifts caused by electrical and/or mechanical components in an active vibration damping system.

BACKGROUND OF THE INVENTION

The invention arose during continuing developmental efforts by the assignee of the present application in seeking improved vibration control for rotary machinery, namely rotary knives as disclosed in co-pending patent application Ser. No. 09/045,466 entitled "A Rotary Knife With Active Vibration Control" by James R. Michler, incorporated by reference herein. During the development of active vibration damping systems using electromagnetic actuators, it was found that the actuators contributed a substantial phase lag to the control system. It was further noticed that implementing such an active damping system without accounting for the phase lag caused a reduction in performance. Therefore, it was desirable to have the control system account for the phase lag caused by the actuator. However, the phase lag was so substantial that conventional techniques, such as phase lead controllers, rendered the system potentially unstable in practice.

The invention involves the use of a new technique for accommodating excessive phase shifts in an active vibration damping system without rendering the system unstable.

BRIEF SUMMARY OF THE INVENTION

The invention involves the use of phasor techniques to adjust model coefficients in state space control systems used for active vibration damping. Using the invention, small and/or large phase shifts can be accommodated effectively, thus improving the performance of active vibration damping systems.

The invention can be implemented in active vibration damping systems having a single degree of freedom, two degrees of freedom (e.g. systems in which the control force is imposed on a tuned mass coupled to the primary mass), or even in systems having higher degrees of freedom. Experience suggests that most practical applications of the invention will be implemented in active tuned mass damping systems in which the tuned mass is coupled to a primary mass in order to reduce vibrations in the primary mass. To implement the invention in such a system, it is preferred that an accelerometer be used to measure the vibrations of the primary mass and another accelerometer be used to measure vibrations in the tuned mass. The signals from the accelerometers are transmitted to a digital signal processor that calculates state signals (e.g., velocity and position signals) for the tuned mass and primary mass in accordance with state space control techniques (e.g. an observer or Kalman filter). The digital signal processor calculates a command signal based on a linear combination of the state signals (i.e., based on the model), and the command signal or a derivative thereof is used to drive an actuator that provides force on the tuned mass for active damping. In accordance with the invention, the coefficients for the controller are pre-selected to account for a known phase shift in the system.

More specifically, the system is preliminarily modeled using conventional system identification techniques to provide a mathematical model of the system, and optimal control techniques (e.g. Ricatti equation or other optimal control technique) to provide preliminary values of the coefficients for the state space controller from the mathematical model. The preliminary coefficients are scaled to account for differences in the units (e.g. scaling by o), where c is the natural frequency of the system measured in radians per second). For each accelerometer input, a phasor (a phase angle and relative phasor magnitude) is calculated from the respective scaled coefficient values. Each phasor is then rotated to accommodate the known phase shift in the system, while the relative magnitude of the phasor is maintained constant. The coefficients are then scaled inversely (e.g. $1/\omega$) to return the value of the coefficients to the original units. These phase-shifted coefficients are the coefficients in the linear combination that generates the command signal from the state signals.

The technique is an effective way of accounting for substantial phase lag/leads in active vibration control system components (e.g. amplifiers, actuators, etc.), yet does not jeopardize system stability and/or performance.

Application of the invention to systems having a single degree of freedom is similar in many respects to the application of the invention to systems having two degrees of freedom, as is the application of the invention to systems having more than two degrees of freedom. In the following detailed description, the invention is described explicitly in conjunction with systems having a single degree of freedom and two degrees of freedom, however, it should be understood that the invention is also useful in applications having three or more degrees of freedom.

Other features and advantages of the invention may be apparent to those skilled in the art upon inspecting the following drawings and description thereof.

DETAILED DESCRIPTION OF THE INVENTION

FIGS. 1 through 5 illustrate the application of the invention in an active vibration control system having a single degree of freedom (i.e., a single mass system). Whereas, FIGS. 6 through 8 relate specifically to a two mass system (i.e. a primary mass system and a tuned mass).

Figure 1:
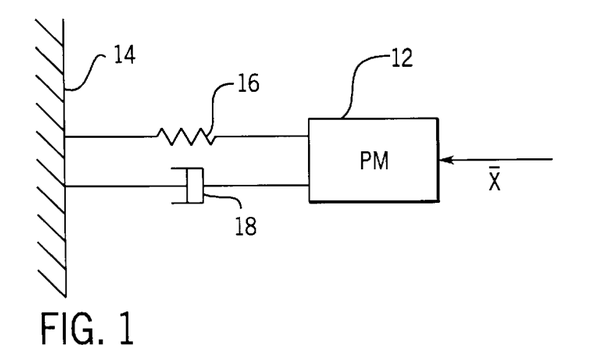
FIG. 1 is a schematic drawing of an analytical model for an active vibration damping system designed to control vibrations of a primary mass in a single mass system (i.e. a system having a single degree of freedom).
Figure 3:
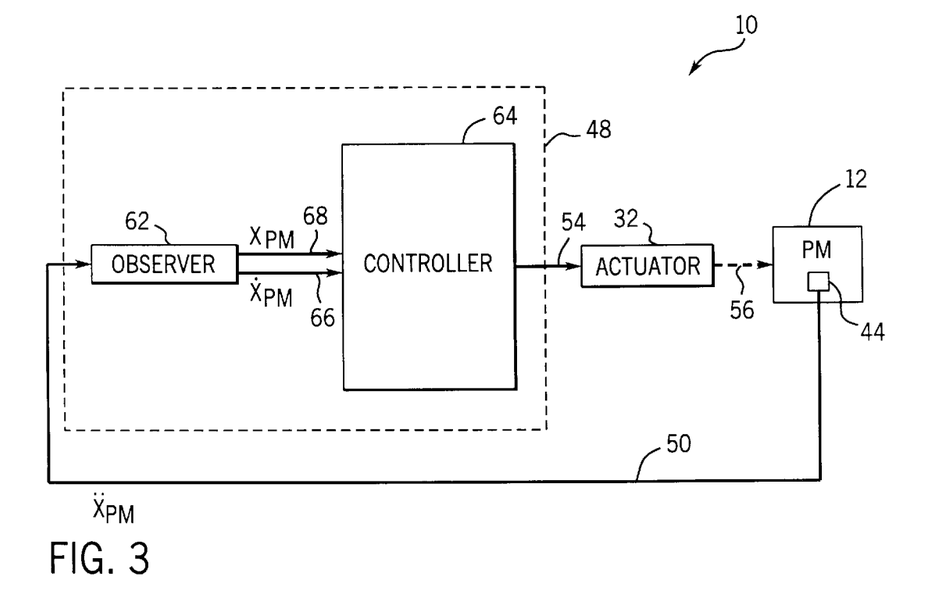
FIG. 3 is a schematic drawing illustrating a state space control system in accordance with the invention for an active vibration damping system having a single degree of freedom.

Referring to FIG. 1, the analytical model illustrates an active vibration damping system 10, FIG. 3, for the purpose of controlling vibrations of a primary mass 12 in a single mass system. The primary mass 12 is mounted to a frame 14. A spring 16, having a spring constant $k_1$, and a passive damper 18, having a damping constant of $c_1$, represent the natural characteristics of the mechanical coupling between the primary mass 12 and the frame 14.

An externally, applied force $\overline{X}$ on the primary mass 12 is supplied by an electronically controlled actuator (not shown). The magnitude (and possibly the direction) of the externally applied force $\overline{X}$ is a function of time or some other related quantity such as frequency. The purpose of the externally applied force $\overline{X}$ is to counteract or actively damp vibrations of the primary mass 12.

Generally speaking, the external force $\overline{X}$ is a phasor having a magnitude X, and a phase angle Φ. In order to enhance performance of active vibration damping 10, it is desirable that the phase D of the external force $\overline{X}$ be optimized with respect to the vibration of the primary mass 12. If the phase Φ is shifted significantly (i.e. lags or leads) from the optimum phase angle, the performance of the active vibration damper 10 will be reduced.

Figure 2:
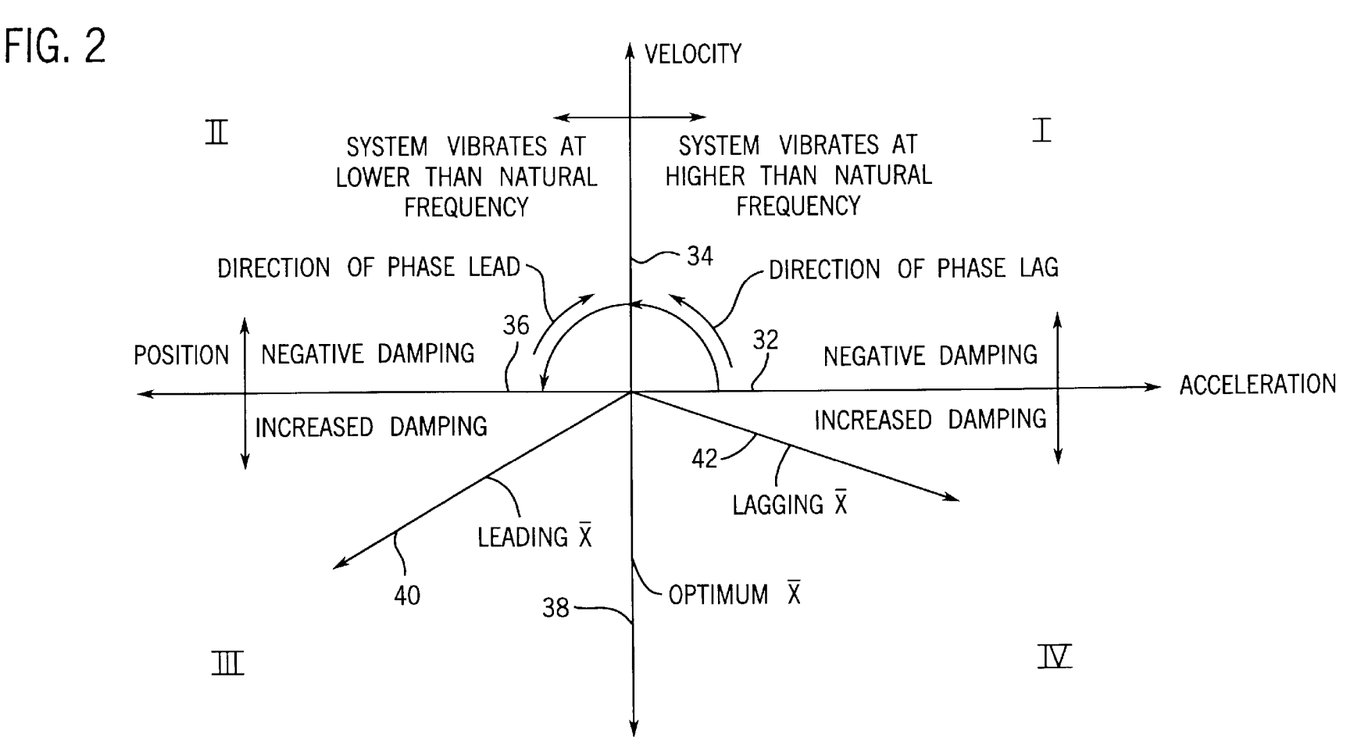
FIG. 2 is a schematic drawing illustrating the effects of phase shifts such as phase lags or phase leads in an active vibration damping system having a single degree of freedom.

FIG. 2 is a phasor diagram illustrating the effects of phase shifts in the external force $\overline{X}$ on active vibration performance. In FIG. 2, the positive direction of axis 32 represents the direction of acceleration in the phasor diagram. The velocity direction 34 is shifted 90° counterclockwise from the acceleration direction, and the position direction 36 is shifted an additional 90° counterclockwise from the acceleration direction. The optimum direction of the external force $\overline{X}$ for active damping is illustrated as phasor 38, which is shifted 180° from the positive velocity direction 34. When the external force $\overline{X}$ is in the optimum direction, phasor 38, the energy input from external force $\overline{X}$ is optimally applied for damping the vibrations of the primary mass 12. However, as previously mentioned, if the phase Φ of external force $\overline{X}$ is shifted substantially to lead (i.e., phasor 40) or lag (i.e., phasor 42) the optimum phasor 38, damping performance can deteriorate severely. In the case of a lagging external force $\overline{X}$ (i.e., phasor 42) or a leading external force $\overline{X}$ (i.e., phasor 40), a substantial amount of the energy from the applied external force $\overline{X}$ effects the vibration frequency of the system rather than provide damping. More specifically, a lagging external force (i.e., phasor 42) supplies energy to increase the vibration frequency of the system. On the other hand, a leading external force $\overline{X}$ (i.e., phasor 40) supplies energy to decrease the vibration frequency of the system. As long as the external force $\overline{X}$ is within approximately 20–30° of the optimum phase (i.e., phasor 38) the system will operate to effectively dampen vibrations of the primary mass 12. On the other hand, if the phase is shifted excessively from the optimum phase (i.e., phasor 38) system performance is compromised. In fact, if the phase Φ is shifted more than 90° from the optimum (i.e., phasor 38) negative damping will occur, and the energy from the external force $\overline{X}$ will actually increase the vibrations of the primary mass.

FIG. 3 schematically illustrates a one-dimensional electronically controlled active vibration damping system for a single mass system. In FIG. 3, vibrations of the primary mass 12 are monitored by accelerometer 44. An electronic control unit 48, preferably a digital signal processor operating at an appropriate sampling rate depending on the natural frequency of the system, inputs a signal from accelerometer 44 for the primary mass 12 through line 50. The electronic control unit 48 outputs a command signal to the actuator 32 through line 54. The actuator 32 provides the external force $\overline{X}$ (Φ,X), depicted as dashed arrow 56 on the primary mass 12 in response to the command signal (line 54) from the electronic control unit 48.

The digital signal processor 48 includes the appropriate A/D and D/A converters to communicate with the analog accelerometer 44 and the analog actuator 32. In accordance with the invention, the electronic control unit 48 implements a state space control system to generate the command signal in line 54. The preferred state space control system includes an observer 62 for the primary mass 12, and a controller 64. The observer 62 inputs a discrete signal (through the respective A/D converter) from the accelerometer 44 monitoring the primary mass 12 during each sampling period k, and outputs state signals, lines 66, 68, for the primary mass 12 for the subsequent sampling period k+1. The controller 64 inputs the state signals, lines 66, 68 for each sampling period k, and outputs a command signal (through a D/A converter) via line 54 for each sampling period k that is used to control the actuator 32. In the preferred system, the state signals outputting the observer 62 are signals representing the position and velocity of the accelerometer 44. More specifically, the state signals output from the primary mass observer 62 shown schematically as line 66, 68 are a primary mass velocity signal for the subsequent sampling period (i.e. PMVel(k+1)) and a primary mass position signal for the subsequent sampling period (i.e. PMPos(k+1)). The preferred primary mass observer 62 is given by the following expression:

$$PMPos(k+1) = K_{P1,PM} * PMPos(k) + K_{P2,PM} * PMVel(k) + K_{P3,PM} * PMAcc(k) \quad (1)$$

$$PMVel(k+1) = K_{V1,PM} * PMPos(k) + K_{V2,PM} * PMVel(l) + K_{V3,TM} * PMAcc(k)$$

here PMAcc (k) represents the value of the primary mass acceleration as measured by the primary mass accelerometer 44 for sample period k, PMVel (k) represents the calculated primary mass velocity for sample period k, PMPos(k) represents the calculated primary mass position for the sample period k, coefficients $K_{P1,PM}$, $K_{P2,PM}$, $K_{P3,PM}$, $K_{V1,PM}$, $K_{V2,PM}$, $K_{V3,PM}$ are pre-selected constants, PMPos(k+1) represents the calculated primary mass position for the subsequent sampling period k+1, and PMVel(k+1) represents the calculated primary mass velocity for the subsequent sampling period k+1.

It is desirable to select the coefficients for the observer 62 so that the observer 62 provides a suitable adaptation rate for estimating accurate state signals yet provide slow enough adaptation to effectively filter and remove noise from the signals from the accelerometer 44. In other words, the observer 62 in addition to calculating velocity and position from the acceleration signal, is a band pass filter that passes signals near the first natural frequencies for the system and rejects the higher order natural frequencies.

The preferred controller 64 inputs the state signals from the observers 60, 62 and outputs a command signal for each sampling period k in accordance with the following expression:

$$Cmd(k) = C_{P,PM} PMPos(k) + C_{V,PM} PMVel(k) \quad (2)$$

where Cmd(k) is the command signal output from the controller 64 for sampling period k, PMPos(k) is the primary mass position for sample period k calculated by the primary mass observer 62, PMVel(k) is the velocity of the primary mass for sample period k as calculated by the primary mass observer 62, and coefficients $C_{P,PM}$ and $C_{V,PM}$ are preselected constants.

In accordance with the invention, the coefficients $C_{P,PM}$ and $C_{PV,PM}$ are selected to account for phase shifts in the system, and preferably so that the external force $\overline{X}$ applied by the actuator 32 has optimum phase, like phasor 38 in FIG. 2.

Figure 4:
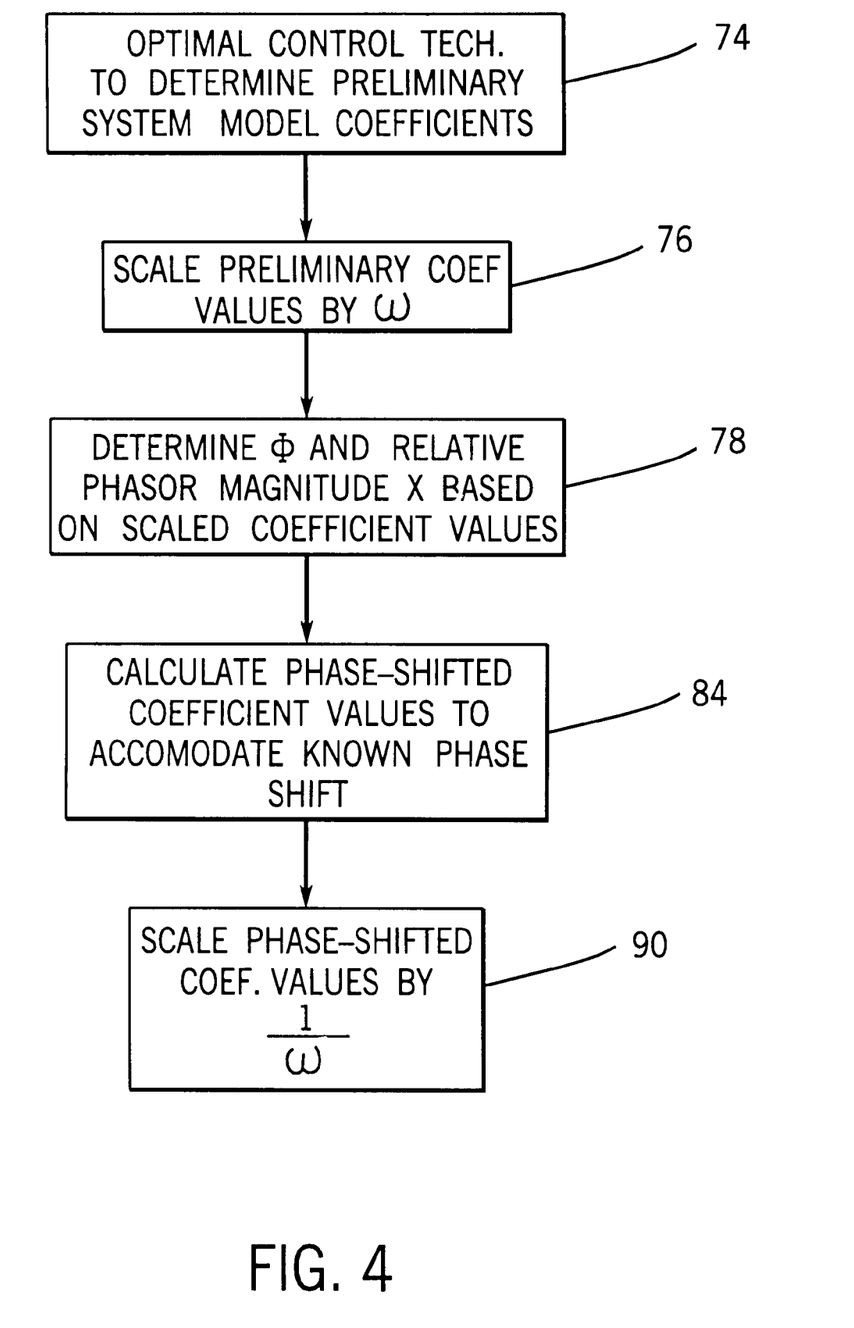
FIG. 4 is a flow chart illustrating the preferred method of accommodating phase shifts by adjusting coefficients in a system state space control model.
Figure 5:
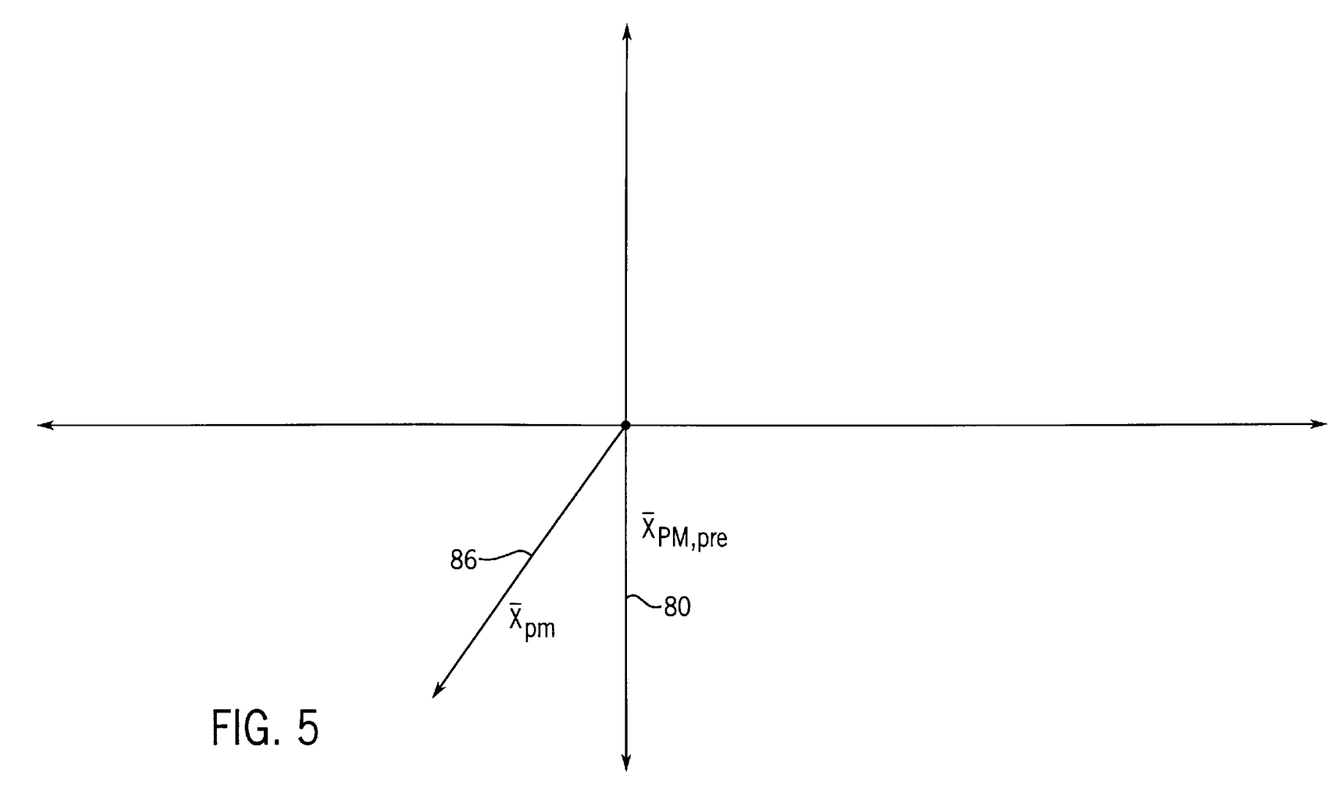
FIG. 5 is a phasor diagram illustrating the shifting of a control force phasor in a single degree of freedom state space control system to account for known phase shifts in the system.

FIG. 4 shows the preferred manner of selecting the constant coefficients $C_{P,PM}$ and $C_{V,PM}$ to account for a known phase shift in the system. Block 74 indicates that optimal control techniques are used to determine preliminary values for the system model coefficients $C_{P,PM}$ and $C_{V,PM}$. System identification techniques are first used to provide a mathematical model of the physical system. For example, system identification techniques as disclosed in *System Identification: Theory for The User*, Lennart Ljung, 1987, Prentice Hall, ISBN 0-13-881640-9, are used to provide mathematical values for spring constants, damping characteristics, lever lengths, etc. to analytically describe the physical system. Then, the Ricatti Equation (or some other optimal control technique) is used to calculate the optimal controller 64 from the system model (i.e., to calculate preliminary values for the coefficients $C_{P,PM}$ and $C_{V,PM}$). Block 76 in FIG. 4 indicates that the preliminary values for the coefficients are scaled by ω where ω is the natural frequency for the system measured in radians. The scaling accounts for differences in units between the coefficients in equation 2. Specifically, the velocity coefficient $C_{V,PM}$ is multiplied by ω where ω is measured in radians (i.e., multiply by 2 II×Hz). Block 78 in FIG. 4 indicates that a phasor representing external force $\overline{X}$ is determined from the scaled values. It should be apparent to those skilled in the art that the scaling of the preliminary coefficient values is an application of non-dimensional analysis methods. The component of external force $\overline{X}$ in response to the primary mass accelerometer is depicted in FIG. 5 by phasor 80, $\overline{X}_{PM,pre}$. Block 84 in FIG. 4 indicates that phase-shifted coefficient values are calculated to accommodate for a known phase shift in the system. FIG. 5 shows a 40° phase shift for external force $\overline{X}_{PM,pre}$ to accommodate a known 40° phase lag in the system. In particular, phasor 80, $\overline{X}_{PM,pre}$ is rotated 40° clockwise to the location of phasor 86, $\overline{X}_{PM}$. It is important that the relative magnitude of the phasor remains constant when the phasor 80 is rotated to the position of phasor 86. The phase-shifted coefficient values $C_{P,PM}$, $C_{V,PM}$, are then calculated from phasor 86, $\overline{X}_{PM}$. Block 90 indicates that the phase shifted velocity coefficient values are then scaled inversely by 1/ω to return the value of the coefficients to the original units of the preliminary values for the coefficients.

Using the above-explained technique, phase shifts in the single mass active vibration control system can be accommodated as long as the phase shifts are known (at least approximately) beforehand.

Figure 6:
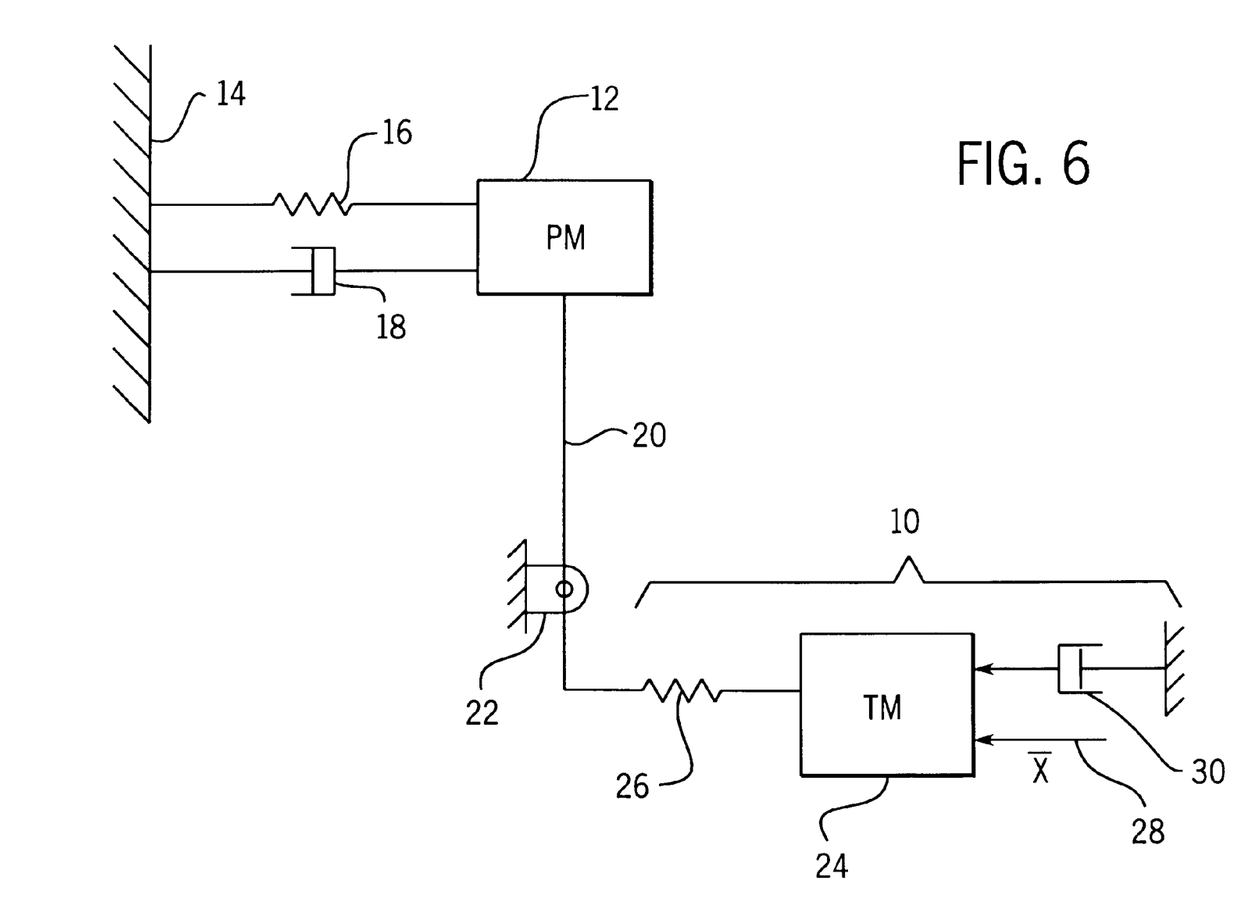
FIG. 6 is a schematic drawing of an analytical model for an active tuned mass damping system designed to control vibrations of a primary mass (i.e. a system having two degrees of freedom).

Referring to FIG. 6, the analytical model illustrates an active tuned mass damping system 10 mechanically coupled to the primary mass 12 for the purpose of controlling vibrations of the primary mass 12 in the two mass system. The primary mass 12 is mounted to a frame 14, and the active tuned mass damper 10 is mechanically coupled to the primary mass 12. This mechanical coupling is shown schematically as hinged member 20 and frame 22. The active tuned mass damper 10 includes a tuned mass 24, a spring arm 26, and an externally applied force $\overline{X}$ designated by arrow 28. Spring 26, having a spring constant $k_2$, and damper 30, having a damper constant $c_2$, represent the mechanical characteristics of the mounting of tuned mass 24 to the hinged member 20. As mentioned, the hinged member 20 represents the coupling of the tuned mass 24 through the machine frame 22 (frame 22 may be the same as frame 14) to the primary mass 12.

Figure 7:
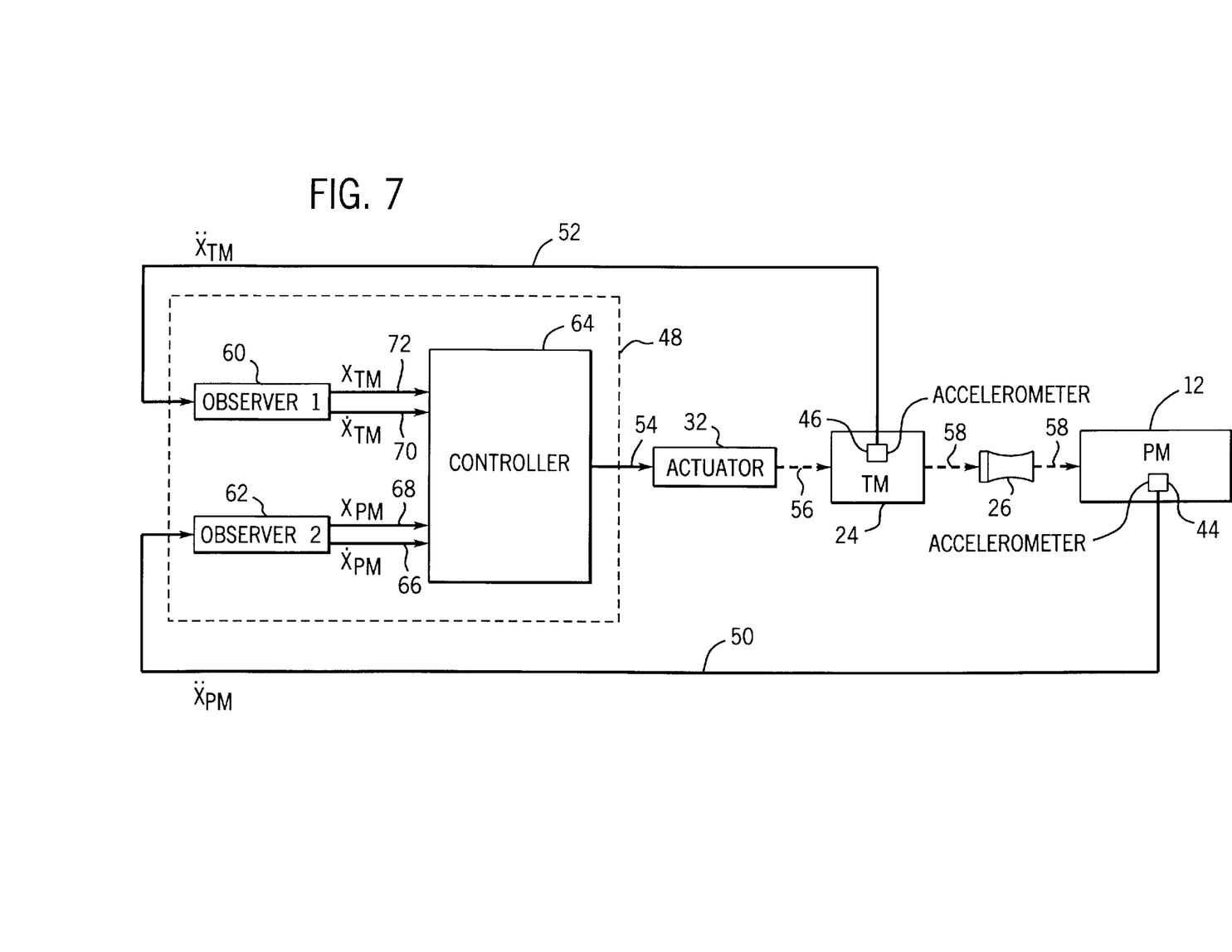
FIG. 7 is a schematic drawing illustrating a state space control system for the active tuned mass damping system shown in FIG. 6.

The external force $\overline{X}$ applied to the tuned mass 24 is supplied by electronically controlled actuator 32, FIG. 7. A suitable actuator is shown and described in co-pending patent application entitled "A Rotary Knife With Active Vibration Control" by James R. Michler, which is assigned to the assignee of the present application, and incorporated herein by reference. The purpose of the external force $\overline{X}$ is to amplify the vibrations of the tuned mass 24, thus improving the damping effect of the tuned mass 24 on vibrations of the primary mass 12 even though mechanical coupling between the tuned mass 24 and the primary mass 12 may be imperfect. An imperfect coupling situation arises, for instance, when the tuned mass 24 is coupled to the primary mass 12 through a frame that does not efficiently transmit vibration energy from the tuned mass 24 to the primary mass 12. Imperfect coupling through the frame 22 is illustrated in FIG. 6 by hinged member 20, which represents the flexibility of frame 22.

In order to enhance performance of the active tuned mass damper 10, it is desirable that the phase Φ of the external force $\overline{X}$ be optimized with respect to the vibration phase of the primary mass 12 and the tuned mass 24. If the phase Φ is shifted significantly (i.e. lags or leads) from the optimum phase angle, the performance of the active tuned damper 10 can be compromised severely.

FIG. 7 schematically illustrates a one-dimensional electronically controlled active tuned mass damping system (i.e. a two mass, active vibration damping system for controlling vibrations of the primary mass 12 in a single direction). In FIG. 7, vibrations of the primary mass 12 are monitored by accelerometer 44, and vibrations of the tuned mass 24 are monitored by accelerometer 46. The electronic control unit 48 (i.e. the digital signal processor) inputs a signal from accelerometer 44 for the primary mass 12 through line 50 and inputs a signal from accelerometer 46 for the tuned mass 24 through line 52. The electronic control unit 48 outputs a command signal to the actuator 32 through line 54. The actuator 32 provides the external force $\overline{X}((\Phi,X)$, depicted as dashed arrow 56 on the tuned mass 24 in response to the command signal (line 54) from the electronic control unit 48. The tuned mass 24 is coupled to the primary mass 12 via the spring 26, as depicted by arrows 58.

The digital signal processor 48 includes the appropriate A/D and D/A converters to communicate with the analog accelerometers 44, 46 and the analog actuator 32. In accordance with the invention, the electronic control unit 48 implements a state space control system for the two mass system to generate the command signal in line 54. The preferred state space control system includes a first observer 60 for the tuned mass 24, a second observer 62 for the primary mass 12, and a controller 64. The second observer 62 inputs a discrete signal (through the respective A/D converter) from the accelerometer 44 monitoring the primary mass 12 during each sampling period k, and outputs state signals, lines 66, 68, for the primary mass 12 for the subsequent sampling period k+1. The second observer 60 for the tuned mass 24 inputs a discrete signal (through the respective A/D converter) from the tuned mass accelerometer 46 during each sampling period k, and outputs state signals for the tuned mass 24, lines 70 and 72, for the subsequent sampling period k+1. The controller 64 inputs the state signals, lines 66, 68, 70, 72, for each sampling period k, and outputs a command signal (through a D/A converter) via line 54 for each sampling period k that is used to control the actuator 32. In this preferred system, the state signals outputting the first observer 60 and the second observer 62 are signals representing the position and velocity of the accelerometers 46 and 44 respectively. More specifically, the state signals outputting the first observer 60 shown schematically as line 70, 72 are a tuned mass velocity signal for the subsequent sampling period (i.e. TMVel(k+1)) and a tuned mass position signal for the subsequent sampling period (i.e. TMPos(k+1)). The preferred tuned mass observer 60 is given by the following expressions:

$$TMPos(k+1)=K_{P1,TM}*TMPos(k)+K_{P2,TM}*TMVel(k)+K_{P3,TM}*TMAcc(k) \qquad (3)$$

$$TMVel(k+1)=K_{V1,TM}*TMPos(k)+K_{V2,TM}*TMVel(k)+K_{V3,TM}*TMAcc(k)$$

where TMAcc (k) represents the value of the tuned mass acceleration as measured by accelerometer 46 for sample period k, TMVel (k) represents the calculated tuned mass velocity for sample period k, TMPos(k) represents the calculated tuned mass position for the sample period k, coefficients $K_{P1,TM}$, $K_{P2,TM}$, $K_{P3,TM}$, $K_{V1,TM}$, $K_{V2,TM}$, $K_{V3,TM}$ are pre-selected constants, TMPos(k+1) represents the calculated tuned mass position for the subsequent sampling period k+1, and TMVel(k+1) represents the calculated tuned mass velocity for the subsequent sampling period k+1.

In a similar manner, the states signals outputting the primary mass observer 62 shown schematically as line 66, 68 are a primary mass velocity signal for the subsequent sampling period (i.e. PMVel(k+1)) and a primary mass position signal for the subsequent sampling period (i.e. PMPos(k+1)). The preferred primary mass observer 62 is given by the following expression:

$$PMPos(k+1)=K_{P1,PM}*PMPos(k)+K_{P2,PM}*PMVel(k)+K_{P3,PM}*PMAcc(k) \qquad (4)$$

$$PMVel(k+1)=K_{V1,PM}*PMPos(k)+K_{V2,PM}*PMVel(l)+K_{V3,TM}*PMAcc(k)$$

where PMAcc (k) represents the value of the primary mass acceleration as measured by the primary mass accelerometer 44 for sample period k, PMVel (k) represents the calculated primary mass velocity for sample period k, PMPos(k) represents the calculated primary mass position for the sample period k, coefficients $K_{P1,PM}$, $K_{P2,PM}$, $K_{P3,PM}$, $K_{V1,PM}$, $K_{V2,PM}$, $K_{V3,PM}$ are pre-selected constants, PMPos(k+1) represents the calculated primary mass position for the subsequent sampling period k+1, and PMVel(k+1) represents the calculated primary mass velocity for the subsequent sampling period k+1.

As mentioned with respect to the single mass system shown in FIG. 3, it is desirable to select the coefficients for the observers 60, 62 such that the observers 60, 62 provide a suitable adaptation rate for estimating accurate state signals, yet provide slow enough adaptation to effectively filter and remove noise from the respective accelerometer signals. In other words, the observers, 60, 62 in addition to calculating velocity and position from acceleration signals, are band pass filters that pass signals near the first natural frequencies for the system and reject the higher order natural frequencies. In most cases, the observers 60, 62 will be mathematically identical.

The preferred controller 64 inputs the state signals from the observers 60, 62 and outputs a command signal for each sampling period k in accordance with the following expression:

$$Cmd(k)=C_{P,PM}PMPos(k)+C_{V,PM}PMVel(k)+C_{P,TM}TMPos(k)+C_{V,TM}TMVel(k) \qquad (5)$$

where Cmd(k) is the command signal output from the controller 64 for sampling period k, PMPos(k) is the primary mass position for sample period k calculated by the primary mass observer 62, PMVel(k) is the velocity of the primary mass for sample period k as calculated by the primary observer 62, TMPos(k) is the position of the tuned mass 24 for the sample period k as calculated by the tuned mass observer 60, TMVel(k) is the velocity of the tuned mass 24 at sample period k as calculated by the tuned mass observer 60, and coefficients $C_{P,PM}$, $C_{V,PM}$, $C_{P,TM}$, and $C_{V,TM}$ are pre-selected constants.

Figure 8:
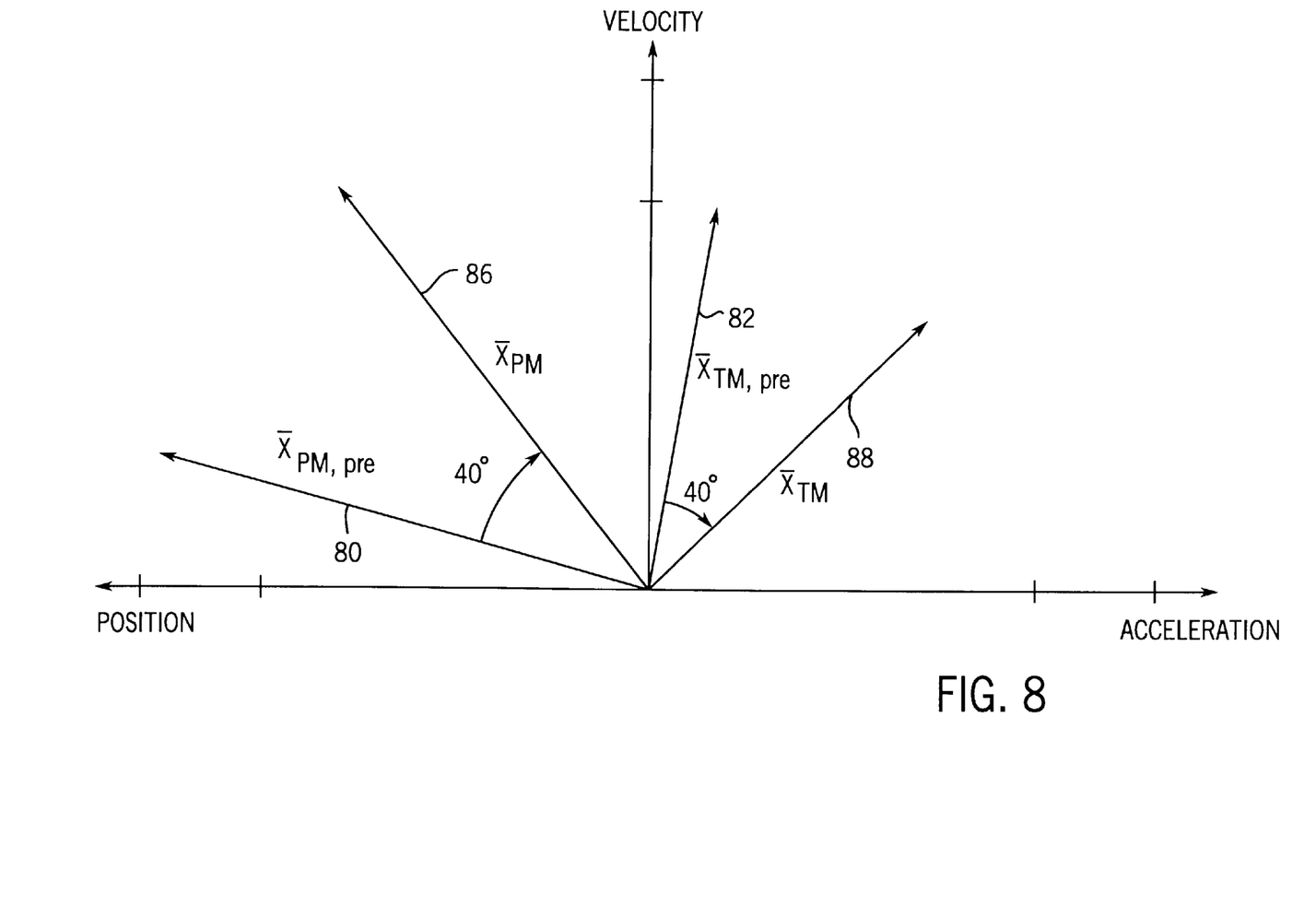
FIG. 8 is a phasor diagram illustrating the shifting of control force phasor components in the state space control model implemented in FIG. 7 to account for known phase shifts in the system.

In accordance with the invention, the coefficients $C_{P,PM}$, $C_{PV,PM}$, $C_{P,TM}$, $C_{V,TM}$ are selected to account for phase shifts in the system, and preferably so that the external force $\overline{X}$ applied on the tuned mass 24 by the actuator 32 has optimum phase. Note that the first two terms in equation 5[i.e., $C_{P,PM}$, PMPos(k)+$C_{V,PM}$, PMVel(k)] contribute a component of the external force $\overline{X}$ in response to the primary mass accelerometer 44; whereas, the second two terms in equation 5[i.e., $C_{P,TM}$, TMPos(k)+$C_{V,TM}$, TMVel(k)] contribute a component of the external force $\overline{X}$ in response to the tuned mass accelerometer 46. Each of these components needs to be addressed separately when adjusting the coefficients $C_{P,PM}$, $C_{V,PM}$, $C_{P,TM}$, $C_{V,TM}$ to accommodate a phase lead or lag in the system. FIG. 8 is a phasor diagram illustrating the independent adjustment of the coefficients for each component of the external force $\overline{X}$.

The component of external force $\overline{X}$ in response to the primary mass accelerometer is depicted in FIG. 8 by phasor 80, $\overline{X}_{PM,pre}$. The component of the external force $\overline{X}$ in response to the tuned mass accelerometer is depicted in FIG. 8 by phasor 82, $\overline{X}_{TM,pre}$. The scaling step to non-dimensionalize phasors 80 and 82 before phase shifting is accomplished using a compromise between the two natural frequencies for the two mass system. Each phasor correlates to a degree of freedom for the system. The coefficients for each component are adjusted in accordance with the technique explained previously in conjunction with FIG. 4 for the single mass system. For example, FIG. 8 shows a 40° phase shift for each component $\overline{X}_{PM,pre}$ and $\overline{X}_{TM,pre}$ of the external force to accommodate a known 40° phase lag in the system. In particular, phasor 80, $\overline{X}_{PM,pre}$ is shifted 40° clockwise to the location of phasor 86, $\overline{X}_{PM}$, and $\overline{X}_{TM,pre}$ is shifted 40° clockwise to the location of phasor 88 $\overline{X}_{TM}$. It is important that the relative magnitude of the phasors 88, 82 remain proportional when the phasors 80, 82 are shifted to the position of phasors 86, 88. The phase-shifted coefficient values $C_{P,PM}$, $C_{V,PM}$, are calculated from phasor 86, $\overline{X}_{PM}$, and the phase-shifted coefficient values $C_{P,TM}$ and $C_{V,Tm}$ are calculated from phasor 88, $\overline{X}_{TM}$, respectively. The phase shifted velocity coefficient values are then scaled inversely by 1/107 to return the value of the coefficients to the original units of the preliminary values for the coefficients as discussed previously with respect to the single mass system.

As mentioned before with respect to the single mass system shown in FIG. 3, it is important to have an adequate estimate of phase shifts in the system beforehand. In the system shown in FIG. 7, it has been found that there is a significant phase lag through actuator 32. To measure the phase lag, a signal generator is used to send a signal to the actuator 32 and contemporaneously to a data acquisition system. The data acquisition system operates at a suitable sampling rate, typically in excess of 2,000 Hz. A load cell is used to monitor the force on the tuned mass 24. The load cell also outputs a signal to the digital data acquisition system. The data from the signal generator is then compared to the data from the load cell, e.g. using cross correlation methods, to determine the amount of phase lag. As long as the other components of the system do not contribute significantly to phase lag/phase leads, the phase lag attributed to the actuator 32 as measured in this manner, is suitable for improving system performance.

The invention has been disclosed explicitly with respect to a one degree of freedom vibration control system (i.e., one mass system shown in FIGS. 1–5) and a preferred embodiment for a two degree of freedom vibration control system (i.e., two mass system shown in FIGS. 6–8). The invention can be implemented, however, in systems having more degrees of freedom as long as additional vibration sensors (e.g. accelerometers) are used, and appropriate modifications are incorporated into the state space control system. The invention has also been disclosed explicitly with respect to systems controlling vibrations of the primary mass in a single direction. It should be apparent to those skilled in the art that the invention can be applied to control vibrations in two or more linearly independent dimensions by using additional vibration sensors, actuators, and state space control to impart other linearly independent external forces $\overline{X}$ on the system. Further, in the preferred embodiment of the invention as shown and described with respect to the drawings, the vibration sensors are accelerometers, however, other types of sensors may be used to implement the invention. To implement the invention, it is necessary that the states of velocity and position be available to the controller 64 (or that some other linearly independent state signals be available to the controller if appropriate modifications are made to the controller). The use of accelerometers as shown and described with respect to the drawings is preferable in many respects over direct sensing of the system states. However, the use of accelerometers as described requires the use of an observer or Kalman filter.

Even with respect to the preferred embodiment of the invention as shown and described with respect to the drawings, it may be possible to implement the invention in modified form without departing from the true spirit of the invention. All such modifications, variations or alternatives should be considered to be equivalent within the meaning of the law and should be considered to fall within the scope of the following claims.

I claim:

1. In an active vibration damping system having a primary mass, a method of actively damping vibrations in a primary mass comprising the steps of:

providing a sensor that measures vibration of an active vibration damping system;

measuring vibration of the active vibration damping system with the sensor and generating a vibration signal in response thereto;

calculating state signals for the system based on the vibration signal; calculating a command signal based on a linear combination of the state signals, each term of the linear combination including a pre-selected constant coefficient; and using the command signal or a derivative thereof to drive an actuator that imposes a force on the system;

wherein the value of the pre-selected constant coefficients are selected to account for known phase shifts in the system in accordance with the following technique:

a) determine preliminary values for the pre-selected coefficients;

b) scale the preliminary values for the coefficients to account for differences in units between the coefficients;

c) determine a phase angle and relative phasor magnitude based on the scaled values of the coefficients;

d) calculate phase-shifted coefficient values which maintain the same relative phasor magnitude but which also accommodate the known phase shift in the system; and scale the value of the phase-shifted coefficient values to return the value of the coefficients to the original units for the preliminary values of the coefficients.

2. A method as recited in claim 1 wherein scaling is accomplished by multiplying and/or dividing the values of the coefficients by a number related to the natural frequency of the system.

3. A method as recited in claim 1 wherein a system identification technique is used to generate a mathematical model of the system and an optimal control technique is used to determine the preliminary values for the constant coefficients from the mathematical model.

4. A method as recited in claim 1 wherein the known phase shift in the system is determined by measuring the phase shift from the generation of the command signal to the force imposed by the actuator.

5. A method as recited in claim 1 further comprising the step of coupling the tuned mass to the primary mass, wherein the actuator imposes the force on the tuned mass to control vibrations of the primary mass.

6. A method as recited in claim 1 wherein the command signal is generated from a linear combination having a first component associated with state signals from a first vibration sensor and a second component associated with state signals from a second vibration sensor, and each of the components is treated as a separate phasor with respect to calculating the phase-shifted coefficients for the respective component.

7. A method as recited in claim 1 wherein the command signal is calculated in accordance with the following expression:

$$Cmd(k)=C_{P,PM}PMPos(k)+C_{V,PM}PMVel(k)$$

where Cmd(k) is the command signal output from the controller for sampling period k, PMPos(k) represents a position for sample period k, PMVel(k) represents a velocity for sample period k, and coefficients $C_{P,PM}$ and $C_{V,PM}$ are pre-selected constants.

8. A method as recited in claim 1 wherein one or more accelerometers are used to measure the vibration of the system and state signals for the system are calculated by one or more observers inputting signals from the one or more accelerometers.

9. A method as recited in claim 1 wherein the vibration of the system is measured directly using velocity and/or position sensors and the state signals for the system are based directly on signals from the velocity and/or position sensors.

10. A method as recited in claim 8 wherein the observer is selected appropriately to filter noise from the signals from the one or more accelerometers.

11. A method of actively damping vibrations in a primary mass comprising the steps of:

coupling a tuned mass to a primary mass;

providing a first sensor that measures acceleration of the primary mass;

measuring acceleration of the primary mass for a plurality of sample time periods k, and generating a discrete signal at each sample period k in response thereto;

providing a second sensor that measures acceleration of the tuned mass;

measuring acceleration of the tuned mass at each sample period k, and generating a discrete signal in response thereto for each sample time period k;

calculating the velocity and position of the primary mass for the subsequent sample period (k+1) based on the measured acceleration of the primary mass for the sample period k, and the calculated velocity and position of the primary mass for the sample period k;

calculating the velocity and position of the tuned mass for the subsequent sample period (k+1), based on the measured acceleration of the tuned mass for the sample period k, and the calculated velocity and position of the tuned mass for the sample period k;

calculating a command signal in accordance with the following expression:

$$Cmd(k)=[C_{P,PM}PMPos(k)+C_{V,PM}PMVel(k)]+[C_{P,TM}TMPos(k)+C_{V,TM}TMVel(k)]$$

where Cmd(k) is the command signal for sample period k, PMPos(k) is the primary mass position for sample period k, PMVel(k) is the velocity for the primary mass for sample period k, TMPos(k) is the tuned mass position for the sample period k, TMVel(k) is the velocity of the tuned mass sample period k, coefficients $C_{P,PM}$, $C_{V,PM}$, $C_{P,TM}$ and $C_{V,TM}$ are pre-selected constants which are selected to account for a known phase shift in the system, the term $[C_{P,PM}$ PMPos $(k)+C_{V,PM}$ PMVel(k)] constitutes a component of control force related to the position and velocity of the primary mass, and the term $[C_{P,TM}$ TMPos(k)+$C_{V,TM}$ TMVel(k)] constitutes a component of control force based on the position and velocity of the tuned mass; and using the command signal or a derivative thereof to drive an actuator that provides a force on the tuned mass;

wherein the value of the pre-selected constant coefficients $C_{P,PM}$, $C_{V,PM}$, $C_{P,TM}$ and $C_{V,TM}$ are selected to account for a known phase shift in the system in accordance with the following technique:

a) determine preliminary values for the pre-selected coefficients $C_{P,PM}$, $C_{V,PM}$, $C_{P,TM}$, $C_{V,TM}$;

b) scale the preliminary values for the coefficients $C_{P,PM}$, $C_{V,PM}$, $C_{P,TM}$, $C_{V,TM}$ to account for differences in units between the coefficients;

c) for each component of control force, determine a phase angle and relative phasor magnitude based on the scaled values of the coefficients;

d) for each component of the control force, calculate phase-shifted coefficient values which maintain the same relative phasor magnitude for each component of the control force but which also accommodate the known phase shift in the system; and scale the value of the phase-shifted coefficient values to return the value of the coefficients to the original units of the preliminary values for the coefficients.

12. A method as recited in claim 11 wherein scaling is accomplished by multiplying and/or dividing the values of $C_{V,PM}$ and $C_{V,TM}$ by a number related to a natural frequency of the system.

13. A method as recited in claim 11 wherein an optimal control technique is used to determine the preliminary values for the constant coefficients.

14. A method as recited in claim 13 wherein the optimal control technique involves the use of the Ricatti Equation.

15. A method of actively damping vibrations in a primary mass comprising the steps of:

providing a sensor that measures acceleration of a primary mass;

measuring acceleration of the primary mass for a plurality of sample time periods k, and generating a discrete signal at each sample period k in response thereto;

calculating velocity and position of the primary mass for the subsequent sample period (k+1) based on the measured acceleration of the primary mass for the sample period k, and the calculated velocity and position of the primary mass for the sample period k;

calculating a command signal in accordance with the following expression:

$$Cmd(k)=[C_{P,PM}PMPos(k)+C_{V,PM}PMVel(k)]$$

where Cmd(k) is the command signal for sample period k, PMPos(k) is the primary mass position for sample period k, PMVel(k) is the velocity for the primary mass for sample period k, coefficients $C_{P,PM}$, and $C_{V,PM}$ are pre-selected constants which are selected to account for a known phase shift in the system; and using the command signal or a derivative thereof to drive an actuator that provides a force on the tuned mass;

wherein the value of the pre-selected constant coefficients $C_{P,PM}$, and $C_{V,PM}$, are selected to account for a known phase shift in the system in accordance with the following technique:

e) determine preliminary values for the pre-selected coefficients $C_{P,PM}$, $C_{V,PM}$;

f) scale the preliminary values for the coefficients $C_{P,PM}$, $C_{V,PM}$, to account for differences in units between the coefficients;

g) determine a phase angle and relative phasor magnitude based on the scaled values of the coefficients;

h) calculate phase-shifted coefficient values which maintain the same relative phasor magnitude but which also accommodate the known phase shift in the system; and scale the value of the phase-shifted coefficient values to return the value of the coefficients to the original units of the preliminary values for the coefficient.

* * * * *